Figure 1:
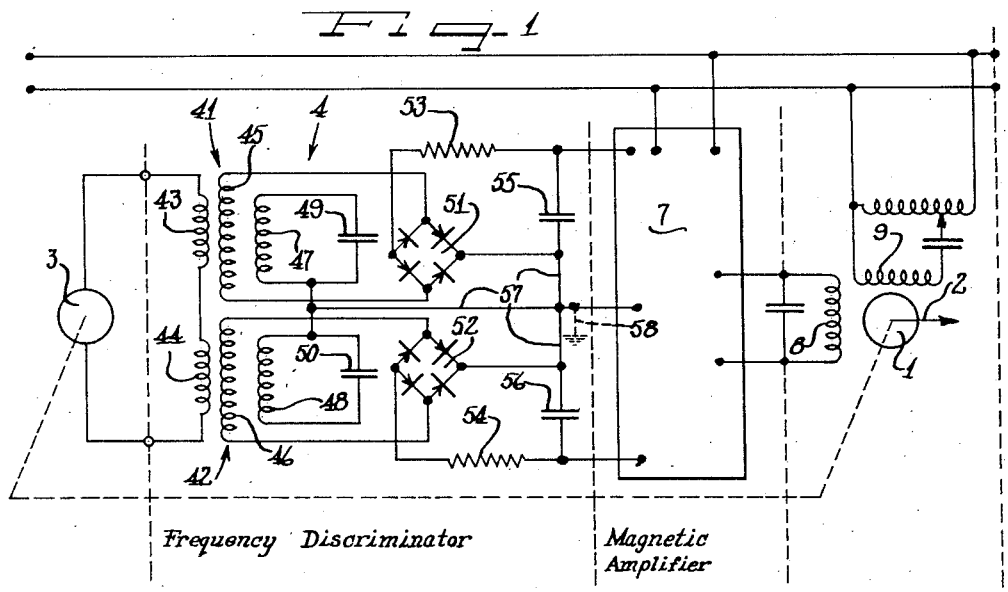

April 23, 1957 S. H. FAIRWEATHER 2,790,126
MAGNETIC SPEED SENSING SYSTEM
Filed Sept. 28, 1953

Inventor
Stephen H. Fairweather

United States Patent Office 2,790,126
Patented Apr. 23, 1957

2,790,126

MAGNETIC SPEED SENSING SYSTEM

Stephen H. Fairweather, South Euclid, Ohio, assignor to Thompson Products, Inc., Cleveland, Ohio, a corporation of Ohio Application September 28, 1953, Serial No. 382,581

4 Claims. (Cl. 318—328)

The present invention relates to magnetic speed sensing and a system for maintaining the speed of an electromechanical system substantially constant.

Although systems for maintaining the speed of rotary motion systems are fairly numerous and well known in the art, most such systems employ mechanical speed sensitive elements such as the flyball governor and various equivalents. These systems although satisfactory for many general uses are inadequate where a high degree of accuracy and only a small allowable percentage of error is required along with a very short response time. Without precision, fast response control generators connected in parallel will not properly deliver the power required of them; should the generators fail to remain in synchronism one will tend to drive the other as a motor and will attempt to deliver all of the power required by the load with the result that it will be overloaded and "burn up".

By the present invention I have obviated the above problems and have provided a system for controlling the speed of a rotary movement device with a high degree of accuracy and with a very fast rate of response.

It is an object of the present invention to provide a speed sensing system wherein a variable frequency signal which is variable in proportion to variations in the speed of the system controlled is provided as the input to a circuit which has an output of variable amplitude and direction as a function of the variation in input frequency from a pre-selected reference frequency.

It is another object of the present invention to provide a magnetic speed sensing and control system for maintaining the speed of a variable speed electromechanical system substantially constant and which utilizes a variable frequency signal wherein the variations in the frequency are a function of variations in speed of the system to be controlled and that signal is transposed into a signal of varying amplitude and direction which is a function of the variation between the signal frequency and the frequency of a preselected reference level and which latter signal controls the system to have a constant speed and corrects speed variations therein.

It is still another object of the present invention to provide a speed sensing and control system incorporating a variable frequency generator which provides the input to a frequency discriminator circuit which in turn controls the speed of the system to be controlled.

It is still another object of the present invention to provide a magnetic speed sensing and control system wherein a variable frequency generator which is driven by the speed controlled element provides a variable frequency signal to a frequency discriminator network which has an output of variable amplitude and sign, dependent upon the variations between the frequency of the generator signal and a preselected reference frequency, which output controls and modifies as necessary the speed of the controlled elements.

It is still another object of the present invention to provide a magnetic speed sensing and control system wherein a generator the frequency of which is dependent upon the speed of the controlled element provides a signal to a frequency discriminator of such nature that its output has a variable amplitude and sign dependent upon the variation in the frequency of the signal which output is amplified and thereafter controls the speed of the controlled element.

Figure 2:
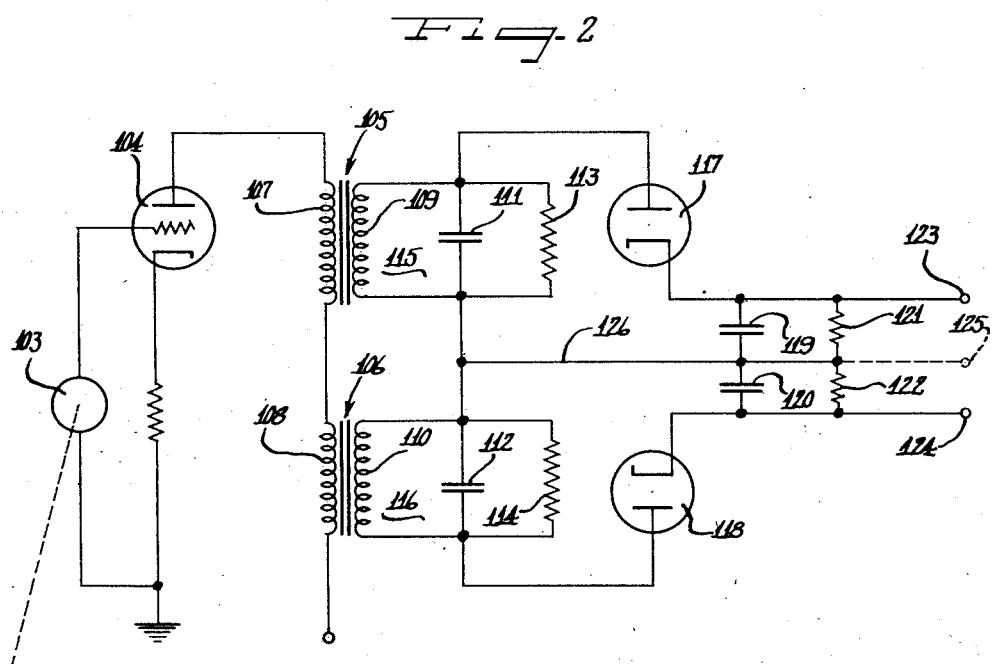

Still further and other objects of the present invention will become apparent from the following description and the accompanying drawings in which like reference numerals refer to like parts and in which:

Figure 1 is a schematic diagram of a complete speed sensing control system embodying the principles of the present invention; and Figure 2 is a schematic diagram of one form of frequency discriminator with a vacuum tube input which may be employed with a speed sensing system and forms a part of the present invention.

By the present invention there is provided a speed sensing system and control with a very fast response time and with an extremely high degree of accuracy.

In Figure 1 there is disclosed and illustrated a schematic diagram of one form of a control circuit for a speed controlled servo-system forming a preferred embodiment of the present invention. A servo motor 1 has its output shaft 2 coupled to a variable frequency generator 3 by any convenient coupling means indicated generally by the broken line connecting the shaft 2 and the variable frequency generator 3. The frequency of the variable frequency generator 3 is a function of the speed of rotation or angular position of the shaft to servomotor 1 depending upon desired systems operational character. Thus, it can be seen that any variations in the rotational speed or angular position of the shaft 2 will result in variation in the frequency of the output of the variable frequency generator 3.

The generator 3 is directly cosnected to a frequency discriminator circuit 4 which in Figure 1 is a frequency discriminator transformer embodying a pair of tuned circuits and a pair of rectifier bridges whereby the output of the frequency discriminator circuit is a direct current signal, the amplitude and direction or sign of which are governed by variations of the frequency of the generator 3. This system will be further described below with regard both to its circuitry details and its functions.

The frequency discriminator 4 is coupled to the variable frequency generator 3 by a pair of transformers 41, 42 each of which has a single primary 43, 44 and a pair of secondaries 45, 47 and 46, 48. The secondary winding 47 of transformer 41 has connected across its terminal a capacitor 49 which, taken together with the secondary 47, establishes a tuned tank circuit tuned to a preselected frequency further described below. The secondary 48 of the transformer 42 similarly has a capacitor 50 connected across its terminal and together therewith form a tuned tank circuit tuned to another preselected frequency also described below.

Each of the transformers 41 and 42 has a secondary 45, 46 thereof connected across preferably a full wave rectifier network 51, 52 respectively which are preferably bridge networks. The bridges 51, 52 have a capacitance resistance filter circuit conected thereacross so that the output of the frequency discriminator transformer which is taken across the filters in preferably a smooth direct current signal. Specifically, the rectifier 51 for the secondary 45 of transformer 41 has connected across its output a resistor 53 and a capacitor 55 in series. Similarly, the rectifier 52 for the secondary 46 of transformer 42 has a resistor 54 and a capacitor 56 connected in series thereacross.

The two parallel halves of the frequency discriminator system, each half including a transformer, a tuned tank, a rectifier bridge and a filter, may be connected together by any convenient means such as lead 57 which may form a common terminal for the output of the two halves of the system and may, if it is found expeditious in the particular environment, be connected to ground as indicated by the broken line 58. The rectifier networks 51 and 52 are so oriented in the system that the outputs thereof are opposed so that when their outputs are equal therein a null output from the network 4.

The output of the frequency discriminator network 4 is taken from across each of the capacitors 55, 56, respectively, of the two filter networks. This output from the frequency discriminator transformer 4 is, in the embodiment illustrated in Figure 1, fed to a magnetic amplifier 7 which, although further described below, operates to amplify an alternating current signal in accordance with the variations in the direct current signal provided by the frequency discriminator transformer and to supply an output to energize one field 8 of the servo-motor 1. The other field 9 of the servo motor 1 is energized from the same source as the source energizing the magnetic amplifier 7.

The magnetic amplifier 7 (the internal circuitry of which is not illustrated) serves, in accordance with known principles, to produce large variations in an alternating current input signal due to small variation in a direct current input signal. Generally, a magnetic amplifier is, in its simplest form, an alternating current transformer with a direct current biasing control coil thereon operating the transformer through the knee of the saturation curve. The small variations in this direct current biasing result in usually large amplitude variations in the alternating current output by virtue of the B-H, or saturation, curve being non-linear in the portion thereof through which a magnetic amplifier is operated.

In operation assuming that the frequency of the output of the variable frequency generator 3, when driven at precisely the proper speed at which the electro-mechanical system should run, is 400 cycles, that 400 cycle output will be impressed upon the frequency discriminator transformers by impressing it upon the primaries 43, 44 respectively of the transformers 41, 42. The tuned circuit including the secondary 47 and the capacitor 49 of the transformer 41 will be tuned to about 375 cycles, or about 25 cycles below the proper frequency of the output of the variable circuitry generator 3. Similarly, the tuned circuit including the secondary 48 and capacitor 50 of the transformer 42 will be tuned to about 425 cycles, or about 25 cycles above the proper frequency for the output of the variable frequency generator 3. This slight detuning of each of the circuits above and below the proper frequency respectively, is provided so that variations in the frequency of the variable frequency generator 3 will cause variations in the output of the transformers and therefore in the outputs of each of the filter circuits including the resistor 53 and the capacitor 55 as well as the resistor 54 and the capacitor 56. The particular frequency of detuning is not critical but it is important that the tanks be detuned equally above and below the preselected control frequency which has been assumed to be 400 cycle per second for purposes of indicating a preferred example.

The filters in the output of the rectifier bridges 51, 52, respectively, are connected in opposition thus providing a null output when they have equal potentials and an output of one sign at increased input frequency and an opposite sign as decreased input frequency. If the frequency of the output of the variable frequency generator 3 is, for purposes of explanation here, 415 cycles then that frequency will closely approach the resonant frequency of the tuned circuit of the transformer 42 and will be further removed from the resonant frequency of the tuned circuit of the transformer 41. This will result in an increased output by the secondary 46 of the transformer 42 with a resultant increased direct current output across the capacitor 56. Conversely, there will be a decreased output in the secondary 45 of the transformer 41 and the resulting decreased output from the rectifier 51 and the filter network including resistor 53 and capacitor 55. Combining the two outputs, the output taken across the capacitor 56 and the output taken across the capacitor 55, under such conditions, it can be readily observed that the direction and amplitude of the resulting output will have been varied from the normal balanced output which obtains when the variable frequency generator 3 is generating a 400 cycle output as an input to the frequency discriminator and transformer 4.

The direct current output from the frequency discriminator transformer 4 is fed directly to the magnetic amplifier 7 as described above which because of the variation in the input thereto will amplify in accordance therewith the alternating current signal taken from the main power line shown and illustrated as being 208 volts 400 cycle power line.

Should the frequency of the output of the variable frequency generator 3 be, for example, about 380 cycles, because of an undesired decrease in the speed of the electro-mechanical system then the output of the transformer 41 will be considerably greater than the output of the transformer 42 in accordance with the above-described principles and the direction and amplitude of the output of the frequency discriminator 4 coupled to the magnetic amplifier 7 will be substantially opposite to its parameters which were extant when the generator 3 operated at a frequency above the 400 cycle normal.

These variations result in variations in the output of the magnetic amplifier 7 and are impressed upon the field coil 8 of the servo-motor 1 which in turn returns the speed of the electro-mechanical system to the preselected proper speed therefor.

The other field coil 9 of servo-motor 1, energized from the main power line shown as being 208 volt 400 cycle power line, is coupled thereto through any convenient variable means such as a variac or a rheostat or an auto-transformer of variable dimension.

Illustrated in Figure 2 is another form of frequency discriminator system which may be used with the magnetic amplifier of Figure 1 or some other system for impressing a variable control voltage on the field of the servo-motor if it is desired to control the speed of a servo-motor rather than controlling a preselected parameter of some other device.

The frequency discriminator illustrated in Figure 2 has an input generated by a variable frequency generator 103 substantially identical to the generator 3 of Figure 1 and driven in much the same way, as by a mechanical coupling to the rotary system to be controlled, and may be any form of variable frequency generator such as a tachometer-generator or the like. The output of the variable frequency generator 103 is impressed upon the grid of a vacuum tube 104 for amplification and the amplified signal is fed to the primaries 107, 108 of a pair of transformers 105, 106. The secondaries 109, 110 of the transformers 105, 106, respectively, form part of tuned tank circuits 115, 116, respectively. The tuned tank circuit 115 is comprised of the parallel arrangement of the secondary 109, a capacitor 111 and a bleeder resistor 113 and the tuned tank circuit 116 is comprised of the secondary 110, a capacitor 112 and a bleeder resistor 114 respectively.

The output of these two circuits are impressed across diodes 117, 118, or other rectifiers, respectively.

Filter circuits connected in the cathode circuits of the diodes 117, 118 form the output circuits for the frequency discriminator. The filter in the cathode circuit for the diode 117 includes the capacitor 119 and the resistor 121. The filter system in the cathode circuit of the diodes 118 is comprised of a capacitor 120 and a resistor 122. The output terminals 123, 124 from said system are taken directly from the cathodes of the diodes 117, 118, respectively, and across both filters. A third terminal 125, indicated by broken line may be employed if the same is found desirable or necessary as a neutral point for use in conjunction with the magnetic amplifier 7 of Figure 1, and will be connected to the junction lead or the common lead 126 between the two halves of the frequency discriminator system.

Again it will be assumed that the proper frequency for the output of the variable frequency generator 3 as driven by the controlled mechanism when the system is at its proper operating velocity will be about 400 cycles. Also, as was the case with respect to the tuned circuits illustrated in Figure 1, the tuned circuits 115, 116 respectively in Figure 2 are tuned respectively to frequencies equally above and below the proper control frequency to be generated by the variable frequency tachometer-generator 103. Thus, for example, the tuned circuit 115 would be tuned to a frequency of about 375 cycles and the tuned circuit 116 would be tuned to a frequency of about 425 cycles per second.

The systems described above with respect to Figure 2 operate in a substantially similar manner to the operation of the system of Figure 1. That is, with the tuned circuit 115 tuned to a frequency of, for example, 425 cycles per second and with the tuned circuit 116 tuned to a frequency of, for example, 375 cycles, the proper operating frequency for the variable frequency generator 103 being, for example, 400 cycles per second, then when the generator 103 is driven by the system to be controlled at a speed above the proper preselected speed, then its frequency output is, for example, 410 cycles per second. An increased output will be provided from one of the two circuits and a decreased output from the other whereby there will be a variation in amplitude and sign of the output of the frequency discriminator circuit which variation is a function of the variation of the frequency of the generator 103 from the normal frequency which would be generated thereby if the system to be controlled were operating at the proper speed.

The speed sensing system illustrated in Figure 2 has an inherent important advantage over many other systems in that the input to the frequency discriminator system is a vacuum tube input. This means that the generator providing the variable frequency to the system will not be loaded and therefore the frequency and voltage of its output will be a true representation of the speed of the rotation of the system to be controlled and thereby will furnish a more accurate control error signal than that furnished by other known systems. It should be understood, however, that a vacuum tube input may be provided to the system of Figure 1 in accordance with the above discussion and description of the systems of Figures 1 and 2 taken together. The output from the frequency discriminator of Figure 2 is taken from across the terminals 123, 124 and fed to any control mechanism satisfactorily employable. The output may be separated into two parts by addition of another terminal, as 125 shown by a broken line, if the same is desired, such an added terminal may be described when employing a frequency discriminator of Figure 2 with the magnetic amplifier 7 of Figure 1 wherein the input may require a three terminal signal separation.

While I have shown and described certain preferred embodiments of my invention, it will of course, be understood that I do not wish to be limited thereto since many modifications may be made, and I, therefore, contemplate by the appended claims to cover all such modifications as fall within the true spirit and scope of my invention.

I claim as my invention:

1. A variable output system to maintain a preselected parameter substantially constant comprising a variable frequency generator, variations in the output frequency of which are proportional to variations in a preselected parameter of a system to be controlled, and a frequency discriminator circuit including a pair of tuned circuits electrically conductively isolated from the system which are tuned tanks one of which is tuned to a frequency slightly above a preselected control frequency and the other of which is tuned to a frequency slightly below said preselected control frequency, said frequency discriminator circuit being coupled to said generator and having an output which varies in amplitude and direction as a function of variations in the frequency of said generator with respect to said preselected control frequency and which output serves to maintain substantially constant the preselected parameter controlling the frequency of said generator.

2. A speed sensing and control system for maintaining the speed of a variable speed servo-motor system substantially constant comprising a variable frequency generator coupled to the shaft of a servo-motor and having an output frequency which is proportional to the speed of said shaft, the speed of said shaft to be controlled, and a frequency discriminator circuit coupled to said generator and having an output the amplitude and direction of which is a function of the variations and the frequency of said generator from a preselected reference frequency, said frequency discriminator circuit including a pair of transformers, one secondary of each of said transformers forming part of a tuned circuit electrically conductively isolated from the system which are tuned tanks one of which is tuned to a frequency slightly above said preselected reference frequency and the other of said tuned circuits being tuned to a frequency slightly below said preselected reference frequency, so that the combined output of said tuned circuits will vary in sign and amplitude in accordance with frequency variation of said generator, and a system coupling said frequency discriminators to said servo-motor to control the speed thereof.

3. A speed sensing and control system for maintaining the speed of a variable speed servo-motor system substantially constant comprising a variable frequency generator coupled to the shaft of a servo-motor and having an output frequency which is proportional to the speed of said shaft, the speed of said shaft to be controlled, an amplifier, and a frequency discriminator circuit coupled to said generator by said amplifier and having an output the amplitude and direction of which is a function of the variations and the frequency of said generator from a preselected reference frequency, said frequency discriminator circuit including a pair of transformers, one secondary of each of said transformers forming a part of a tuned circuit respectively, one of said tuned circuits being tuned to a frequency slightly above said preselected reference frequency and the other of said tuned circuits being tuned to a frequency slightly below said preselected reference frequency so that the combined output of said tuned circuits will vary in sign and amplitude in accordance with frequency variation of said generator, and a system coupling said frequency discriminators to said servo-motor to control the speed thereof.

4. A speed sensing control system for maintaining the speed of a variable speed servo-motor system substantially constant comprising a variable frequency generator coupled to the shaft of a servo-motor and having an output frequency which is proportional to the speed of said shaft, the speed of said shaft to be controlled, and a frequency discriminator circuit coupled to said generator and having an output, the amplitude and direction of which is a function of the variations of the frequency of said generator from a preselected reference frequency, said frequency discriminator circuit including a pair of transformers each having a pair of secondary windings thereon, one secondary winding of each of said transformers forming a part of a tuned tank circuit, respectively, one of said tuned tank circuits being tuned to a frequency slightly above said preselected reference frequency and the other of said tuned tank circuits being tuned to a frequency slightly below said preselected reference frequency, an output circuit, the other secondaries of said transformers being opposingly coupled to said output circuit so that the combined output of said transformers, including said tuned circuits, will vary in sign and amplitude in accordance with frequency variations of said generator, and a system coupling said frequency discriminators to said servo-motor to control the speed thereof.

References Cited in the file of this patent

UNITED STATES PATENTS

| | | |
|---|---|---|
| 1,552,781 | Von Arco | Sept. 8, 1925 |
| 1,776,592 | MacDonald | Sept. 23, 1930 |
| 2,496,730 | Lindbeck et al. | Feb. 7, 1950 |
| 2,682,633 | Woerdemann | June 29, 1954 |